Feb. 16, 1937. T. L. DUNBAR ET AL Re. 20,266
METHOD AND APPARATUS FOR THE DIGESTION OF FIBROUS MATERIAL
Original Filed Nov. 20, 1931
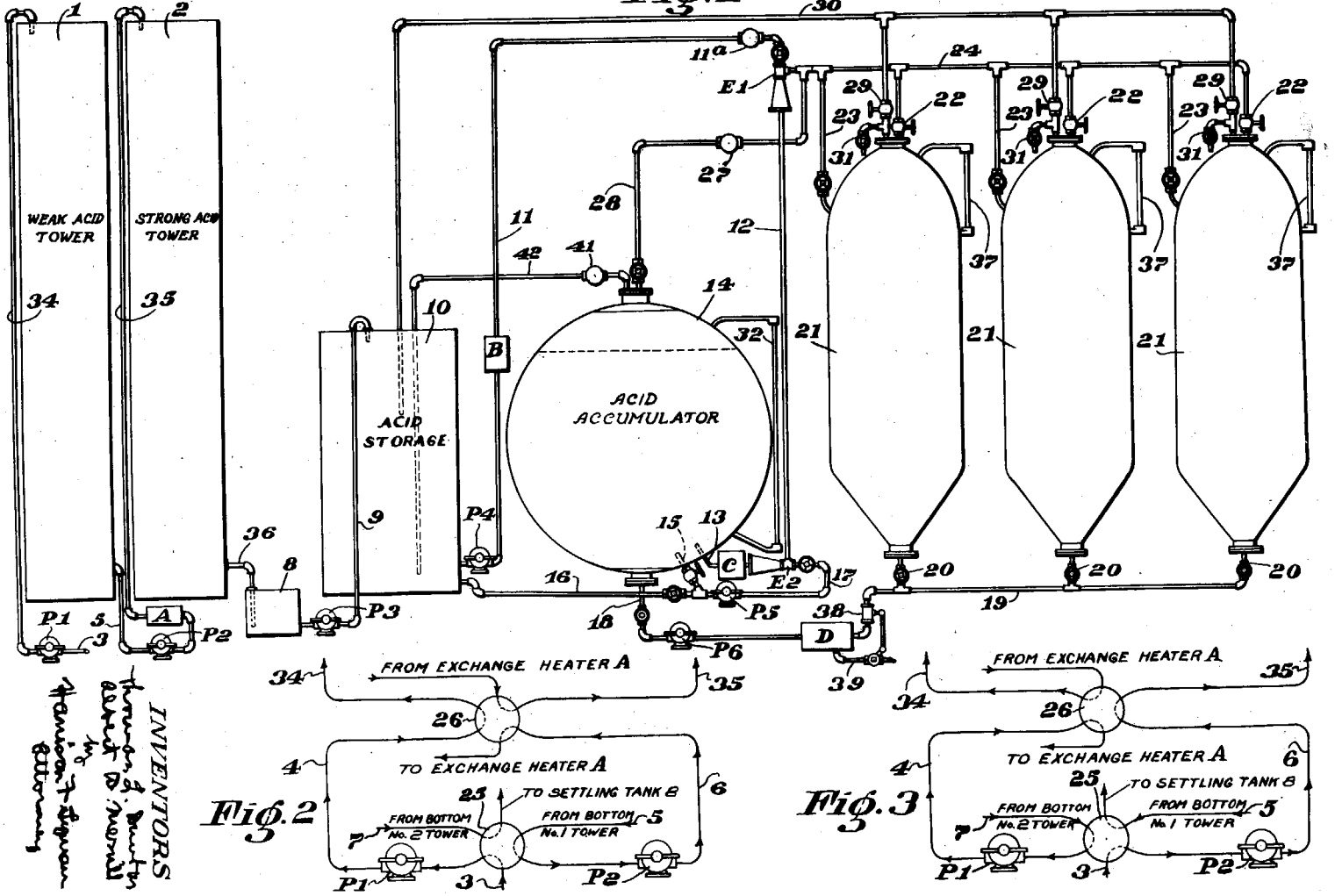
INVENTORS
Thomas L. Dunbar
Robert D. Merrill
by
Harrison F. Lyman
Attorney Reissued Feb. 16, 1937

Re. 20,266

UNITED STATES PATENT OFFICE 20,266

METHOD AND APPARATUS FOR THE DIGESTION OF FIBROUS MATERIAL

Thomas Leonidas Dunbar and Albert Darius Merrill, Watertown, N. Y.

Original No. 1,918,459, dated July 18, 1933, Serial No. 576,254, November 20, 1931. Application for reissue January 29, 1935, Serial No. 3,984

39 Claims. (Cl. 92—7)

The present invention relates to an improved method and apparatus for the digestion of fibrous material, such as wood chips.

In the digestion of fibrous material, it has been proposed to recover the gases and liquors exhausted from the digesters during the cooking process and to utilize the same to strengthen and heat the raw acid liquor before it is fed into the digesters for the next cook.

One of the objects of our invention is to provide a method of and apparatus for further heating the acid liquor before its entrance into the digesters, so that it is brought to the most advantageous temperature without substantial loss of $SO_2$.

Another object of our invention is to provide means whereby the pressure in the accumulator is maintained substantially constant.

It is a further object of our invention to provide improvements in the construction and operation of the apparatus employed in the digestion of fibrous material whereby uniformity in the results obtained may be materially promoted, economies in construction and operation effected and the efficiency of operation increased.

Having in view these objects as well as others which will appear as the description proceeds, the invention consists in the novel features hereinafter described in detail, illustrated in the accompanying drawing and more particularly pointed out in the appended claims.

In the drawing:

Fig. 1 shows in elevation one apparatus forming the subject matter of the present invention with certain parts omitted for greater clearness;

Fig. 2 is a diagram of connections to acid towers when No. 1 tower is the weak tower, and Fig. 3 is a diagram of connections to acid towers when No. 2 tower is the weak tower.

In the drawing, 1 and 2 are acid towers, one being the weak and the other the strong acid tower. The order in which liquor passes through these towers is reversible by means of the connections shown in Figs. 2 and 3, so that if normally operated the tower that is the weak acid tower one day will be the strong acid tower the next day. Figs. 1 and 2 show the tower 1 as the weak acid tower. In this case (referring especially to Fig. 2), the 6-way valves 25 and 26 are set so that water coming through the line 3, which is the suction line from the fresh water supply, passes from the valve 25 through the pump P1, the discharge line 4 of the pump P1, the 6-way valve 26 and the line 34 to the top of the acid tower 1. After passing through the tower 1, the resulting liquor is taken from the bottom of this tower by the line 5 and passes through the valve 25, pump P2, line 6, valve 26, exchange heater A, again through the valve 26, and thence by means of the line 35 to the top of the tower 2. After passing through this tower, the liquor is led through the line 7, valve 25 and line 36 to the settling tank 8.

When 2 is operated as the weak acid tower and 1 as the strong tower, the valves 25 and 26 are set as shown in Fig. 3. In this case the water supply passes through the line 3, valve 25, pump P2, line 6, valve 26 and line 35 to the top of the tower 2. From the bottom of this tower the liquor passes through the line 7, valve 25, pump P1, line 4 and valve 26 to the exchange heater A, and thence through the valve 26 and line 34 to the top of the tower 1. From the bottom of this tower it passes through line 5, valve 25 and line 36 to the settling tank 8, all as shown in Fig. 3.

The pump P3 takes the acid liquor from the settling tank 8 and discharges the same through the line 9 into the acid storage tank 10. From the tank 10 the acid liquor is withdrawn by the pump P4 and forced through the line 11, the exchange heater B and the check valve 11a to the eductor E1. This eductor is provided with a regulating valve and is of the type shown and described in our copending application Ser. No. 528,696, filed April 8, 1931. 12 is a drop or condenser leg which carries the mixed fresh acid liquor and hot digester relief fluids from the eductor E1 to the eductor E2. The eductor E2 is similar to eductor E1 and may or may not be provided with a regulating valve.

The pump P5 is provided with valved suction lines 15 and 16 so that acid can be pumped either from the storage tank 10 or from the accumulator 14 through the discharge line 17 and the eductor E2. From the eductor E2 the liquor passes through the exchange heater C and the line 13 into the accumulator 14 near the bottom thereof. The accumulator 14 is spherical in shape and is provided with a gauge glass 32 or other liquid level indicator.

The suction line 18 leads from the bottom of the accumulator to the pump P6, which is used for filling the digesters by forcing the hot preconditioned acid from the accumulator through the exchange heater D and thence through the discharge line 19 and the valved branches 20 to the digesters 21. The thermostatic control 38 has its element located in the line 19 between the heater D and the branches 20, and is connected to a valve in the heat supply (for example steam) line 39 to the heater D, so as to control the heat supplied at this point. Thus when the temperature of the acid in the line 19 exceeds a certain point, say 110° C., the thermostatic control will operate to shut off further heat supply to the heater D, and when this temperature drops below another point, say 105° C., the steam or other heating medium will be automatically admitted again. Similar thermostatic controls, set to operate at different temperatures to be discussed later, may be connected to the other exchange heaters A, B and C, if desired. Since such controls are well known in the art, it is not necessary to describe them in further detail, nor to indicate their presence at more than one point in the apparatus.

Each digester is provided with a gauge for accurate determination of the liquid level therein, either a gauge glass as shown at 37, or an indicating or recording liquid level gauge.

The valved relief branch 29 leads from the top of the digester to the header 30, which header discharges into the acid storage tank 10 at a point approximately four feet below the normal liquid level in this tank. From the branch 29, the valved relief branch 31 vents immediately to the atmosphere.

The valved relief branch 22 leads from the top of the digester to the main relief header 24 leading to the eductor E1. The valved relief branch 23 leaves the digester at a point a little below the normal liquid level maintained in the digester, and exhausts into the header 24. A bypass line 28 leads from the header 24 to the top of the accumulator 14. The pressure regulating valve 27 in the line 28, the operation of which will be more fully described at a later point, automatically vents the relief gases and liquor from the header 24 directly into the top of the accumulator when the pressure in the accumulator drops below a predetermined point.

The pressure regulating valve 41 in the line 42 vents gases from the top of the accumulator into the contents of the acid storage tank whenever the pressure in the accumulator rises above a predetermined point (normally about 30 pounds). The line 42 leads from the top of the accumulator over and down into the contents of the acid storage tank to the depth necessary for absorption of the vented gases.

In the practice of our improved method, the digester is filled with chips from a bin or conveyor (not shown) by removing the manhole cover at the top of the digester. After the digester has been filled with chips, the manhole cover is bolted on and all connections made to the relief lines.

The acid liquor which is next pumped into the digester has been preheated not only by direct absorption of heat from the relief gases and liquors from the digesters, but also by the exchange heaters A, B, C and D. By reason of the higher temperature, thus obtained, of the acid entering the digester, less steam is required to bring the contents of the digester to the desired temperature, resulting in a saving of steam and a reduction of the dilution of the acid by steam condensation. While it has been proposed to heat the acid liquor by means of exchange heaters before its entry into the digester, prior methods of accomplishing this either fail to raise the acid to the most desirable temperature at the point of its entry to the digester, or result in loss of $SO_2$ from the acid, or both. Our new method and apparatus present the very important advantage over methods practiced up to the present time, that we so heat the liquor throughout the system that we maintain its $SO_2$ content while raising it to the most advantageous temperature by the time it enters the digesters. The exchange heaters shown in the accompanying drawing are of a type known to the art, and heat may be supplied thereto in any convenient manner, such as by utilizing hot relief liquors from the digesters, by steam, or in any other suitable manner. The phrase "indirectly heating" in the appended claims is employed to designate heating, as by an exchange heater, in which the heating and the heated mediums do not come into direct contact with each other, as distinguished from "direct" heating such as takes place when the hot relief gases and fluids from the digester system come into direct contact with the acid liquor to be heated in the drop leg 12.

The heater A is located between the weak and the strong towers of the acid system, and by its use we are able to control the combined $SO_2$ in the system acid. The higher the temperature in the acid making system, the higher will be the combined $SO_2$ in the acid. If, however, the temperature in the acid making system should run too high or if the acid going to the weak tower were heated, considerable $SO_2$ would be lost, as the weak acid tower is open to atmospheric pressure at the top to vent $CO_2$ gases formed by the reaction between the limestone, water and $SO_2$ gas. By placing the exchange heater A between the weak and strong acid towers, we can control the temperature and thereby the combined and total $SO_2$ percentages in the system acid, thereby accomplishing a result which has long been desired in maintaining the strength of the system acid more nearly constant. By maintaining the system acid at the desired percentages of free and combined $SO_2$, we make for more uniform results in the process since the uniformity of the cooking acid is to a large extent dependent upon the uniformity of the system acid.

The acid in the storage tank 10 being at atmospheric pressure, this acid should not be at a temperature higher than 45° C., as otherwise it would not hold its free $SO_2$ when agitated by the flow of relief fluids entering the body of liquor. At more elevated temperatures, there will be a loss of $SO_2$ unless the pressure on the acid is correspondingly increased above atmospheric. Further, since the tank 10 is ordinarily constructed of wood, a mild cooking of the wood tank would result if the temperature of the acid were in excess of this point, thereby shortening the life of the tank.

The acid in the line 11 is under pressure, as the pump P4 delivers its rated capacity against a total head of approximately 300 feet (or 130 pounds pressure). The acid in this line can therefore be further heated by the heater B without loss of its $SO_2$. If, however, too much heat is applied at this point, the acid going to the eductor E1 will be too volatile and will not act to condense the hot gases, vapors and liquors vented from the digesters through the header 24. We therefore only raise the temperature of the acid a few degrees in the line 11—say 10° C.

After the acid has passed the eductor E2, its temperature may be raised to correspond to the pressure which it is desired a carry in the accumulator 14. The exchange heater C is therefore located at this point to accomplish this result.

The pressure carried in the line 19 is normally higher than the pressure carried in the accumulator 14. Heat can therefore be again applied to the acid as it is being pumped to the digester, by the heater D. The contents of the digester should not be raised to a temperature above 110° C. before the acid has penetrated into the raw material as surface delignification would take place, thereby weakening the acid and preventing the penetration of acid of a high concentration into the center of the chips. This results in too high a percentage of uncooked wood when the finished pulp is produced. The thermostatic control 38 is therefore provided which may be set so as to shut off the heat when the temperature of the acid in the line 19 reaches 110° C., the heat coming on again when the temperature drops to 105° C.

In filling the digesters with acid, acid is withdrawn from the accumulator by means of the pump P6, and is forced through the exchange heater D, the line 19 and whichever one of the valved branch lines 20 leads to the digester which is being filled. In the usual operation of sulphite mills, only one digester is filled at a time, it having been found in general best to have approximately an equal time interval between the several digester filling operations. While the digester is being filled with acid, the valves in the branches 22 and 23 are closed and the valve in the branch 20 is open. During the first part of the filling time, the valve in the branch 29 is closed and the valve in the branch 31 is open, thereby venting air to the atmosphere from the digester as the liquor rises therein. As soon as gas (which is readily detected by its odor) appears at the vent of the branch 31, the valve in the branch 31 is opened and the valve in the branch 29 is opened. This passes the gases that rise from the digester during the filling operation, by means of the branch 29 and the header 30, back to the acid storage tank 10 where they are recovered, thereby avoiding smell in the digester room and also saving the gases. Thus the term "fresh" acid in this specification and in the appended claims may include acid which has been partially preconditioned by absorption in the storage tank of these gases.

As soon as the digester has been solidly filled with liquor, the valve in the branch 29 is also closed and a pressure of about 50 pounds is placed on the digester by means of the pump P6. As soon as this pressure has been reached, the valve in the branch 20 is closed and all other valves of the digester are also closed for a soaking period of approximately one hour.

At the end of this soaking period, steam is admitted to the bottom of the digester through a steam line (not shown) and the valve in the relief line 22 at the top of the digester is opened, thereby venting fluids to the main header 24 and thence to the eductor E1. After a period of time varying with the wood conditions—particularly the moisture content of the wood—the valve in the line 22 is closed and the valve in the line 23 is opened in order to draw off relief liquor from the side of the digester. The valve in the branch 23 is left open until the liquid level in the digester has been lowered to the proper point. The appearance of dry gas at the top of the digester indicates that the level is approaching this point. The presence of dry gas at the top of the digester is readily determined by slightly opening the valve in the line 22, as the sound produced by dry gas passing through this line is considerably different from that produced by wet gas or liquid.

The steaming of the digester dilutes the acid somewhat and after the valve in the branch 23 is closed raises the liquor level in the digester, due to steam condensation. The extent of this condensation varies with the moisture content of the steam. In any event, it is important for uniform results that the liquor level in the digester at the end of the cook be very nearly constant in all cases. We therefore provide each digester with a gauge glass or other indicating liquid level gauge and/or with a recording liquid level gauge of a type known in the art. The indicating liquid level gauge is convenient for the mill operators, since it can be read from a considerable distance, whereas the recording gauge gives a record enabling the superintendent or the technical department to check afterwards on the proper operation of the digesters. By the use of a level gauge and by proper manipulation of the valves in the lines 22 and 23, the final liquor level in the digester may be substantially standardized at a definite point, say five or six feet below the top manhole cover plate. It will be evident that the higher the moisture content of the steam used in the steaming of the digester, the more liquor will be withdrawn through the side relief branch 23, in order that the final liquor level may be at the standardized point. This final level may vary in different installations and with differing operating conditions, so long as it is substantially standardized for the same set of conditions in the same installation.

The relief gases and liquids entering the header 24 through the lines 22 and 23 are conducted by the header 24 to the eductor E1, where they meet the flowing stream of liquor coming through the line 11 to this eductor, and contacting and passing therewith down the drop leg 12 to the eductor E2 they are absorbed by and give up heat to this liquor. The two eductors E1 and E2 permit us to carry a much higher pressure in the accumulator than is carried in the relief header 24, and our improved apparatus therefore requires only one main relief header.

The accumulator 14 is spherical in shape. Thus smaller surface area is required for a given capacity, thinner steel plates will suffice for a given working pressure, and the cost of the accumulator installation is materially reduced. An additional and very important advantage of our spherical accumulator is that we obtain a better drop leg effect since the height of the liquid level for a given capacity is greatly reduced.

We normally operate the accumulator so that the acid level in same has reached a point from six to ten feet below the top of the sphere at the time it is necessary to pump a digester. In order that the depth of the acid may be ascertained, we provide the accumulator with a gauge glass 32 and/or with other liquid level indicating or recording means. The desired liquid level is attained by proper regulation of the regulating valve in the eductor E1.

In order to keep the acid analysis constant, it is important that the pressure be maintained substantially constant in the accumulator. In the operation known to the prior art, the pressure in the accumulator drops from 10 to 25 pounds during the time a digester is being pumped. As the pressure drops, the acid in the accumulator gives up an amount of its free $SO_2$ gas directly proportional to the drop in pressure and the prevailing temperature, and the acid pumped at the end of the filling period is weaker than that pumped at the beginning. In order to overcome this variation in pressure and the resultant variation in acid strength, we provide the automatic pressure regulating valve 27 in the by-pass line 28, which leads from the header 24 around the eductor E1 to the top of the accumulator. The valve 27 is set for a certain pressure differential, for example one pound. Then if at any time the pressure in the relief header 24 exceeds by one pound differential that in the line 28, the valve 27 opens and gases are by-passed around the eductor E1 and directly into the acid accumulator. Thus when a digester is being filled and there is a tendency for the pressure in the accumulator to drop, the valve 27 opens and permits the relief fluids from the other digesters to vent directly into the accumulator through the by-pass 28, maintaining the pressure in the accumulator.

When the pressure in the accumulator rises above a predetermined point (normally about 30 pounds), the valve 41 in the vent line 42 relieves gases from the top of the accumulator into the acid storage tank, preventing excessively high pressure in the accumulator. At the same time, conducting these accumulator gases into the storage tank prevents the escape into the atmosphere of these gases, which are obnoxious and destructive to human and vegetable life. Further, by conducting these gases into the storage tank we save the $SO_2$ and the heat units thereof.

Our invention produces a product decidedly superior to that heretofore obtainable. The fibre is distinctly more silky and paper manufactured therefrom is more pliable and has higher tensile, tear and fold strength. The mullen thereof can be controlled and may be unusually high, and the product is lighter in color.

We claim:

1. In the digestion of fibrous material by the sulphite process, progressively raising the temperature of acid liquor as the pressure thereon progressively increases during its passage from the weak acid tower to the digester and utilizing the heated liquor for the digestion of fibrous material.

2. In the digestion of fibrous material by the sulphite process, intermittently and indirectly heating the acid liquor as the pressure thereon is intermittently and progressively increased during the course of its passage from the acid making system to the digester system.

3. In the digestion of fibrous material by the sulphite process, progressively raising the acid liquor to a temperature above 100° C. during its passage from the acid-making system to the digester without substantial loss of free $SO_2$ by increasing the temperature of the acid in proportion to the pressure to which it is progressively subjected during the course of such passage to the digester.

4. In the preparation of acid liquor for the digestion of fibrous material by the sulphite process, controlling the $SO_2$ percentages in the system acid by regulated heating of the acid after it has passed through the weak acid tower and before it enters the strong acid tower.

5. In the preparation of acid liquor for the digestion of fibrous material, indirectly heating the acid during its passage through the raw acid system.

6. In the preparation of acid liquor for the digestion of fibrous material, heating the system acid after it leaves the weak acid tower and before it enters the strong acid tower.

7. In the preparation of acid liquor for the digestion of fibrous material by the sulphite process, heating the acid during its passage through the raw acid system to such a degree as to obtain necessary combined $SO_2$ content without substantial loss of free $SO_2$.

8. In a process of the character described, increasing the acid strength of fresh liquor by contacting the same in a conduit with relief gases and liquids from a digester system, indirectly heating the strengthened liquor after such contact, passing the same into an accumulator and maintaining the liquor in the accumulator under superatmospheric pressure.

9. In a process of the character described, pumping acid liquor under pressure from a pressure accumulator into a digester and heating the liquor while under such pressure and before it enters the digester and absorbing gases and vapors discharged from the digester in the liquor in the accumulator.

10. In a process of the character described, forcing acid liquor under pressure from an accumulator into a digester, indirectly heating the liquor while under such pressure and before it enters the digester, and automatically controlling the temperature of the liquor entering the digester within fixed limits.

11. In a process of the character described, contacting acid liquor in a conduit with relief gases and liquids from a digester system, passing the acid liquor after such contact into a pressure accumulator, withdrawing liquor from said accumulator and when the withdrawal of acid liquor from the accumulator lowers the pressure therein below that in the relief line by a predetermined differential, passing relief gases and liquids from the digester system directly into the accumulator without previous contact with the acid liquor.

12. In a process of the character described, contacting acid liquor in a conduit with relief gases and liquids from a digester system, passing the acid liquor after such contact into a pressure accumulator and substantially maintaining the pressure in the accumulator by admitting gases and liquids from the digester system thereto directly and without previous contact with the acid liquor when the pressure in the digester system relief line exceeds by a fixed differential the pressure in the accumulator.

13. In a process of the character described, continuously passing relief gases and liquids from a digester system into contact with fresh acid liquor to strengthen and heat the fresh liquor, maintaining the strengthened and heated liquor under pressure in an accumulator, and intermittently passing relief gases and liquids from the digester system directly into the accumulator to maintain the pressure therein.

14. In the digestion of fibrous material, charging a digester with hot acid liquor and fibrous material, and releasing acid liquor from the side of the digester until sufficient liquor has been relieved so that at the end of the cook the liquor level in the digester will have reached substantially a predetermined level.

15. In the digestion of fibrous material, bringing the liquor in the digester to a predetermined level above the upper surface of the fibrous material and below the top of the digester at the end of the cook.

16. In an apparatus of the character described, a weak acid tower, a strong acid tower, means for passing acid liquor from the weak to the strong tower, and means for heating the acid liquor after it leaves the weak tower and before it enters the strong tower.

17. In an apparatus of the character described, two acid towers reversibly connected in series so that acid liquor may be passed from one tower to the other and an exchange heater so connected as to heat the acid liquor in the course of its passage from one tower to the other.

18. In an apparatus of the character described, an acid storage tank, a conduit connecting said tank to a drop leg having an eductor at either end thereof, a pump for forcing acid liquor under pressure from the storage tank to the head of the drop leg, and means interposed in said conduit between the pump and the eductor at the head of the drop leg for heating the liquor.

19. In an apparatus of the character described, a drop leg having an eductor at either end thereof, a conduit leading from the eductor at the bottom of the drop leg to a pressure accumulator, and means for heating acid liquor in the course of its passage along said conduit from the bottom eductor to the accumulator.

20. In an apparatus of the character described, a pressure accumulator, a digester, a conduit for acid liquor leading from said accumulator to said digester, means for heating the acid liquor after it leaves the accumulator and before it enters the digester and a thermostatic control for automatically regulating the amount of heat imparted to the liquor by the said heating means.

21. In an apparatus of the character described, a weak acid tower, a strong acid tower, an acid storage tank, a drop leg, an accumulator and a digester, all connected in series, and means for heating acid liquor after it leaves the weak acid tower and before it enters the strong acid tower, after it leaves the storage tank and before it enters the drop leg, after it leaves the drop leg and before it enters the accumulator, and after it leaves the accumulator and before it enters the digester.

22. In an apparatus of the character described, a pressure accumulator, a conduit for feeding acid liquor to the accumulator, a jet eductor interposed in said conduit, a digester system vent header connected to said jet eductor, a by-pass conduit leading from the digester system vent header to the accumulator and an automatic pressure regulating valve in the by-pass conduit.

23. In an apparatus of the character described, a pressure accumulator, a passageway for feeding acid liquor to the accumulator, a digester system vent header connecting with the lower part of the accumulator, a conduit leading from the digester system vent header to the upper part of the accumulator and having interposed therein means for admitting gases and liquors from the digester system vent header through the conduit when the pressure in the digester system vent header exceeds by a fixed differential the pressure in the accumulator.

24. In an apparatus of the character described, a spherical accumulator, a conduit having interposed therein a drop leg with jet eductors on both ends thereof for feeding acid liquor to said accumulator and a digester system vent header connected to the jet eductor at the head of the drop leg.

25. In an apparatus of the character described, a pluralty of digesters each provided with a liquid level gauge, a spherical accumulator, a conduit having interposed therein a drop leg with jet eductors on both ends thereof for feeding acid liquor to the accumulator and a single relief header connecting the digesters with the accumulator through the eductor at the head of the drop leg.

26. In a process of the character described, contacting acid liquor with relief gases and liquids from a digester system, passing the acid liquor after such contact into a pressure accumulator, and minimizing pressure variations in the accumulator by admitting gases and liquids from the digester system thereto directly and without previous contact with the acid liquor when the pressure in the accumulator drops below the pressure in the digester system relief line by a predetermined differential, and by relieving gases from the accumulator when the pressure therein exceeds a predetermined point.

27. In a process of the character described, passing acid liquor under pressure from a storage tank to means for absorbing gas under pressure, and raising the temperature of the liquor approximately 10° C. in the course of its passage from the storage tank to the said gas absorption means.

28. In the digestion of fibrous material, digesting successive charges of fibrous material under heat and pressure in a digester, and terminating the cooking of successive charges of fibrous material of substantially the same characteristics with the liquor in the digester at substantially the same level.

29. In apparatus of the character described, a digester provided with a liquid level gauge operative to indicate the liquid level within the digester during the cooking operation, means for admitting cellulosic material to and withdrawing pulp from the digester, means for filling the digester with liquor and means for withdrawing liquor from the digester to control the height of the liquor level therein.

30. In a process of the character described, digesting cellulosic material in a digester with a digesting liquor containing a volatile component; establishing a volume of such liquor in a separate receptacle, recirculating the liquor to and from such receptacle, heating such recycle liquor exteriorly of the receptacle, and utilizing the recycle stream to withdraw the volatile component from the digestion zone and admix with the recycle liquor stream.

31. In a process of the character described, digesting cellulosic material in a digester with a digesting liquor having a volatile component; establishing a volume of the liquor in a separate pressure receptacle, recirculating the liquor directly to and from the receptacle, heating the recycle stream exteriorly of the receptacle with hot reaction products, and utilizing such recycle stream to withdraw volatile components from the digestion zone and admix them with the recycle liquor stream.

32. In a process of the character described, digesting cellulosic material in a digester with a digesting liquor having a volatile component; establishing a volume of the liquor in a separate pressure receptacle, recirculating the liquor directly to and from the receptacle, indirectly heating the recycle stream exteriorly of the receptacle with hot reaction products, and utilizing such recycle stream to withdraw volatile components from the digestion zone and admix them with the recycle liquor stream.

33. In a process of the character described, establishing a volume of digestion liquor in a pressure receptacle, withdrawing a stream of liquor from the receptacle and forcing it back into the receptacle, directly heating said recycle stream by admixing therewith hot reaction products from a digestion operation, and after such admixture further heating the recycle stream indirectly and before discharge into the receptacle.

34. In an apparatus for the delignification of cellulosic material including a digester and an acid receptacle for the digestion liquor, in combination, a recycle line connected at each end to the receptacle, a pump and indirect heater in such line, and an ejector incorporated in the line and adapted to receive fluids from the digester and admix such fluids with liquor flowing through the recycle line.

35. In a process of the character described, digesting cellulosic material in a digester with a digesting liquor which includes a volatile component; establishing a volume of such liquor in a separate receptacle, recirculating the liquor to and from the receptacle and indirectly heating the recycle stream of liquor exteriorly of the receptacle, utilizing such stream to withdraw volatile components from the digestion zone and admix such components with the recycle liquor stream, and introducing relatively cool liquor from an extraneous source into the recycle stream.

36. In a process of the character described, pumping acid liquor under pressure from a hot acid receptacle into a digester and adding heat to said liquor while under such pressure and prior to its entry into the digester.

37. In an apparatus of the character described, an acid liquor accumulator of sufficient capacity to carry several digester charges, a digester, means for forcing the liquor under pressure from the receptacle to the digester, and means for heating the liquor while under such pressure and before it enters the digester.

38. In an apparatus of the class described, a digester provided with means to indicate the level of liquid therein throughout the cooking operation, means to charge cellulosic material and digestion liquor to the digester, and a liquid relief line operative to withdraw liquor from the digester during the cooking operation to a predetermined level as indicated by said means.

39. In the digestion of fibrous material, admitting a charge of cellulosic material and digestion liquor to a pressure digester, establishing cooking conditions of temperature and pressure within the digester, associating with the digester a device adapted to indicate the level of the liquid therein throughout the cooking operation; relieving liquor from the digester during the cooking to a predetermined level as indicated by said liquid level device.

THOMAS LEONIDAS DUNBAR.
ALBERT DARIUS MERRILL.